(12) United States Patent
Nahey et al.

(10) Patent No.: US 7,918,908 B2
(45) Date of Patent: Apr. 5, 2011

(54) DUST COLLECTOR WITH EQUALIZED CLEANING PERFORMANCE

(75) Inventors: Brian Nahey, Hartland, WI (US); Glenn W. Bitner, Alsip, IL (US); Michael T. Gerardi, Orland Park, IL (US)

(73) Assignee: Venturedyne, Ltd., Pewaukee, WI (US)

( * ) Notice: Subject to any disclaimer, the term of this patent is extended or adjusted under 35 U.S.C. 154(b) by 337 days.

(21) Appl. No.: 12/112,621

(22) Filed: Apr. 30, 2008

(65) Prior Publication Data

US 2009/0272082 A1   Nov. 5, 2009

(51) Int. Cl.
  *B01D 46/04*   (2006.01)
(52) U.S. Cl. ............................................ 55/302; 95/280
(58) Field of Classification Search ............... 55/294, 55/302, 283; 95/279, 280; 210/791; 137/15.1, 137/83; 222/151; 141/70; 239/126, 153, 239/222.11, 222.21
See application file for complete search history.

(56) References Cited

U.S. PATENT DOCUMENTS

| | | | |
|---|---|---|---|
| 3,436,899 A | 4/1969 | Pausch | |
| 3,499,268 A | 3/1970 | Pausch | |
| 3,683,595 A * | 8/1972 | Houghton et al. | 55/302 |
| 3,798,878 A | 3/1974 | Pausch | |
| 3,874,857 A | 4/1975 | Hunt et al. | |
| 3,876,402 A | 4/1975 | Bundy et al. | |
| 3,973,935 A | 8/1976 | Moore, Jr. et al. | |
| 4,033,732 A | 7/1977 | Axelsson et al. | |
| 4,077,781 A | 3/1978 | Sundstrom | |
| 4,157,899 A | 6/1979 | Wheaton | |
| 4,235,610 A | 11/1980 | Richard | |
| 4,251,244 A | 2/1981 | Evenstad | |
| 4,278,454 A * | 7/1981 | Nemesi | 55/302 |
| 4,433,986 A | 2/1984 | Borst | |
| 4,436,536 A | 3/1984 | Robinson | |
| 4,544,382 A | 10/1985 | Taillet et al. | |
| 4,578,092 A * | 3/1986 | Klimczak | 55/302 |
| 4,666,472 A * | 5/1987 | Klimczak et al. | 95/280 |
| 4,789,387 A | 12/1988 | Nemesi et al. | |
| 4,910,047 A | 3/1990 | Barnett et al. | |
| 4,955,996 A | 9/1990 | Edwards et al. | |
| 5,002,594 A | 3/1991 | Merritt | |
| 5,062,867 A | 11/1991 | Klimczak | |
| 5,062,873 A * | 11/1991 | Karlsson | 55/302 |
| 5,395,409 A | 3/1995 | Klimczak et al. | |

(Continued)

*Primary Examiner* — Duane Smith
*Assistant Examiner* — Minh-Chau Pham
(74) *Attorney, Agent, or Firm* — Michael Best & Friedrich LLP

(57) ABSTRACT

A particulate filtration device comprising filter media having upstream and downstream surfaces, a gas-moving device for moving gas through the filter media from the upstream surface toward the downstream surface, and a cleaning assembly including a blow pipe having a plurality of cleaning nozzles for directing a flow of cleaning gas toward the filter media. A first one of the cleaning nozzles comprises a structural characteristic (e.g., throat size, exit angle, exit size) that is different than a second one of the cleaning nozzles. In one embodiment, the filter media comprises a filter bag corresponding with each nozzle, and both the first one and the second one of the cleaning nozzles are spaced substantially the same distance from the corresponding filter bag. The cleaning assembly can also include a plurality of blow pipes (e.g., each having a plurality of cleaning nozzles) coupled to a gas-pressurized manifold, and a valve positioned between the manifold and each blow pipe to control gas flowing from the manifold to the blow pipes. In this configuration, it is preferred that the nozzle nearer the manifold has a larger throat size, smaller exit angle, and larger exit size than the nozzle farther from the manifold.

20 Claims, 6 Drawing Sheets

U.S. PATENT DOCUMENTS

| | | |
|---|---|---|
| 5,549,734 A | 8/1996 | Standard |
| 5,562,746 A * | 10/1996 | Raether .......................... 55/302 |
| 5,616,171 A | 4/1997 | Barris et al. |
| 6,022,388 A * | 2/2000 | Andersson et al. ............. 55/302 |
| 6,129,852 A * | 10/2000 | Elliott et al. .................. 210/791 |
| 6,149,716 A * | 11/2000 | Bach et al. ...................... 95/280 |
| 6,332,902 B1 * | 12/2001 | Simonsen et al. .............. 55/302 |
| 6,554,138 B1 | 4/2003 | Bihlet et al. |
| 6,786,946 B2 | 9/2004 | Jung |
| 6,902,592 B2 * | 6/2005 | Green et al. ..................... 55/302 |
| 6,908,494 B2 * | 6/2005 | Gillingham et al. ............ 55/283 |
| 7,195,659 B2 * | 3/2007 | Sporre et al. ..................... 55/302 |
| 7,485,163 B2 * | 2/2009 | Yoshimoto ....................... 55/302 |
| 2002/0100261 A1 * | 8/2002 | Richard ........................... 55/302 |
| 2003/0121238 A1 * | 7/2003 | Richard ........................... 55/302 |
| 2005/0252178 A1 * | 11/2005 | Richard ........................... 55/302 |
| 2006/0075726 A1 | 4/2006 | Yoshimoto |
| 2007/0039290 A1 * | 2/2007 | Lee .................................. 55/302 |
| 2008/0127826 A1 * | 6/2008 | Raether ........................... 95/280 |
| 2009/0217630 A1 * | 9/2009 | Bitner ............................... 55/294 |

\* cited by examiner

DUST COLLECTOR WITH EQUALIZED CLEANING PERFORMANCE

BACKGROUND

The present invention generally relates to the field of particulate filtration assemblies and, more particularly, to systems for cleaning filters within such assemblies.

Particulate filtration assemblies function to remove contaminates from the air or other fluid medium. One type of particulate filtration assembly is a dust collector for filtering dust particles out of the air. Dust collectors mainly use a filter media, such as a filter bag, to trap dust particles and allow cleaned air to pass through the filter. Over time the trapped dust particles build up a dust cake on the upstream side (e.g, outside) of the filter media, greatly reducing the efficiency of the dust collector.

Dust collectors typically include a system for cleaning the filter media when it gets clogged with particulate. Such cleaning systems commonly are designed to shoot or force pressurized pulses of air into the opening of the filter media from downstream (e.g., inside) of the media. The air is often forced through a cleaning nozzle that accelerates the air to supersonic speeds prior to being forced toward the filter media. The cleaning air momentarily flows through and agitates the filter media by reversing the oncoming fan air, resulting in particulate dislodging and falling into a particulate removal system, such as a hopper.

Cleaning systems for dust collectors commonly utilize a single blowpipe for providing compressed air to multiple (e.g., as many as sixteen) nozzles. Each nozzle is positioned to provide high-velocity air to a corresponding filter media. As pressurized air is provided to one end of the blowpipe from a manifold, all nozzles attached to the blowpipe will function to direct air to all corresponding filter media.

SUMMARY

When pressurized air is provided from the manifold to one end of the blowpipe, the pressure pulse travels the length of the blowpipe until it contacts the opposing, closed end of the blowpipe. At that time, the pressure in the blowpipe quickly builds, starting at the closed end of the blowpipe and progressing back toward the manifold. As the pressurized air travels the length of the blowpipe and sequentially provides pressurized air to the nozzles, the pressure of the air reduces slightly. As a result, the pressure provided to the nozzle closest to the manifold is slightly less than the pressure provided to the nozzle farthest from the manifold. This results in a difference in performance of the various nozzles positioned on the same blowpipe. This phenomenon is illustrated in FIG. 7, which shows the pressure at three different nozzles after providing 100 psig air from the manifold to the blow pipe. After an initial period of time of about 0.074 seconds, the pressure at the nozzle farthest from the manifold is higher than the pressure of the nozzle closest to the manifold, and remains that way until the pressures have subsided. These test results show that there is a pressure differential of about 9.5% between the nearest and farthest nozzles.

The present invention recognizes this phenomenon and modifies the nozzles accordingly in order to reduce the difference in performance of nozzles positioned on the same blowpipe. More specifically, the present invention provides a particulate filtration device comprising filter media having an upstream surface and a downstream surface, a gas-moving device for moving gas through the filter media from the upstream surface toward the downstream surface, and a cleaning assembly including a blow pipe having a plurality of cleaning nozzles for directing a flow of cleaning gas toward the filter media. A first one (e.g., a plurality) of the cleaning nozzles comprises a structural characteristic (e.g., throat size, exit angle, exit size) that is different than a second one (e.g., a plurality) of the cleaning nozzles.

In one embodiment, the filter media comprises a filter bag corresponding with each nozzle, and both the first one and the second one of the cleaning nozzles are spaced substantially the same distance from the corresponding filter bag. The cleaning assembly can also include a plurality of blow pipes (e.g., each having a plurality of cleaning nozzles) coupled to a gas-pressurized manifold, and a valve positioned between the manifold and each blow pipe to control gas flowing from the manifold to the blow pipes. In this configuration, it is preferred that the nozzle nearer the manifold has a larger throat size, smaller exit angle, and larger exit size than the nozzle farther from the manifold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
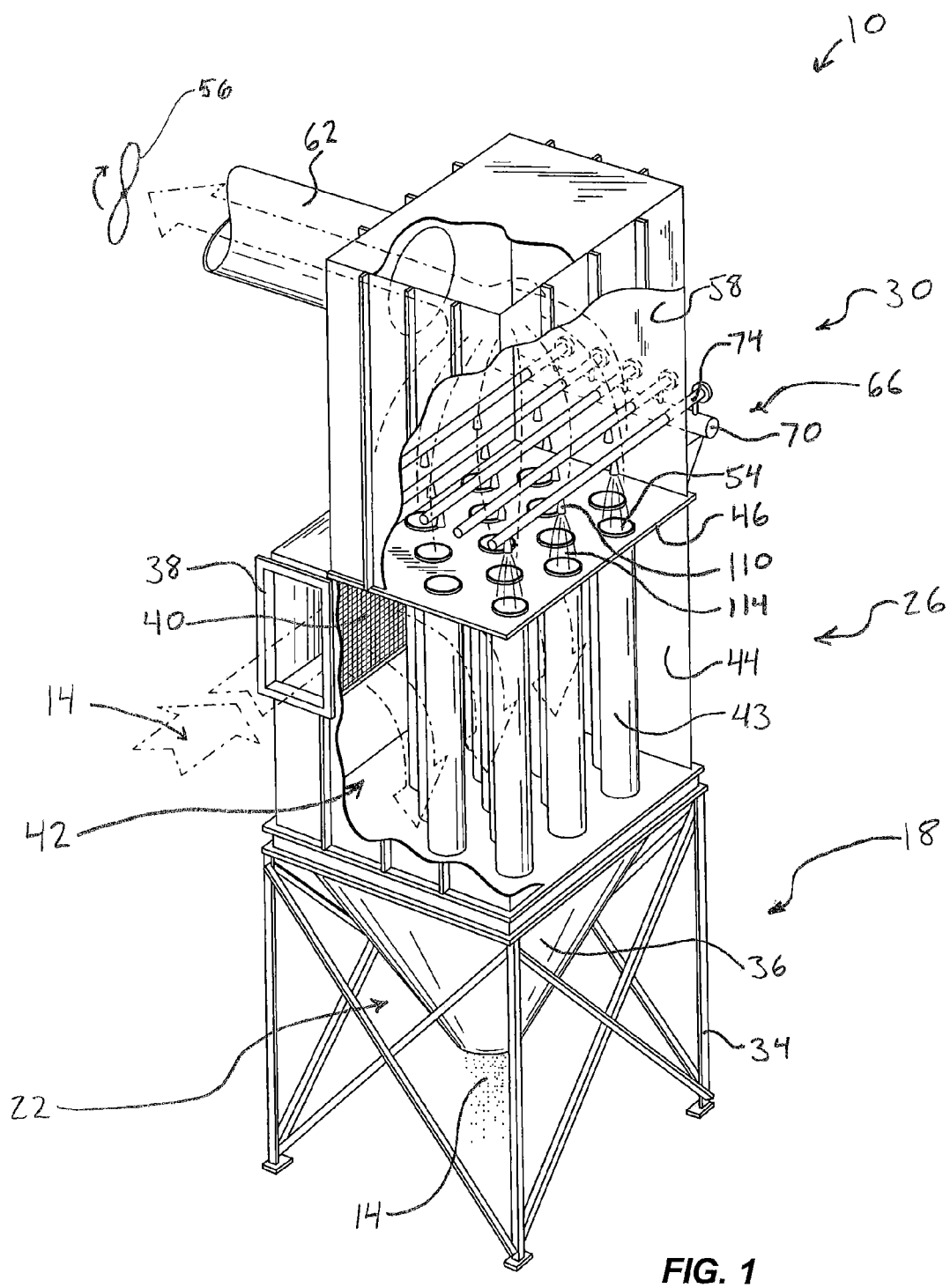
FIG. 1 is a cut-away perspective view of a particulate filtration device embodying the present invention.
Figure 2:
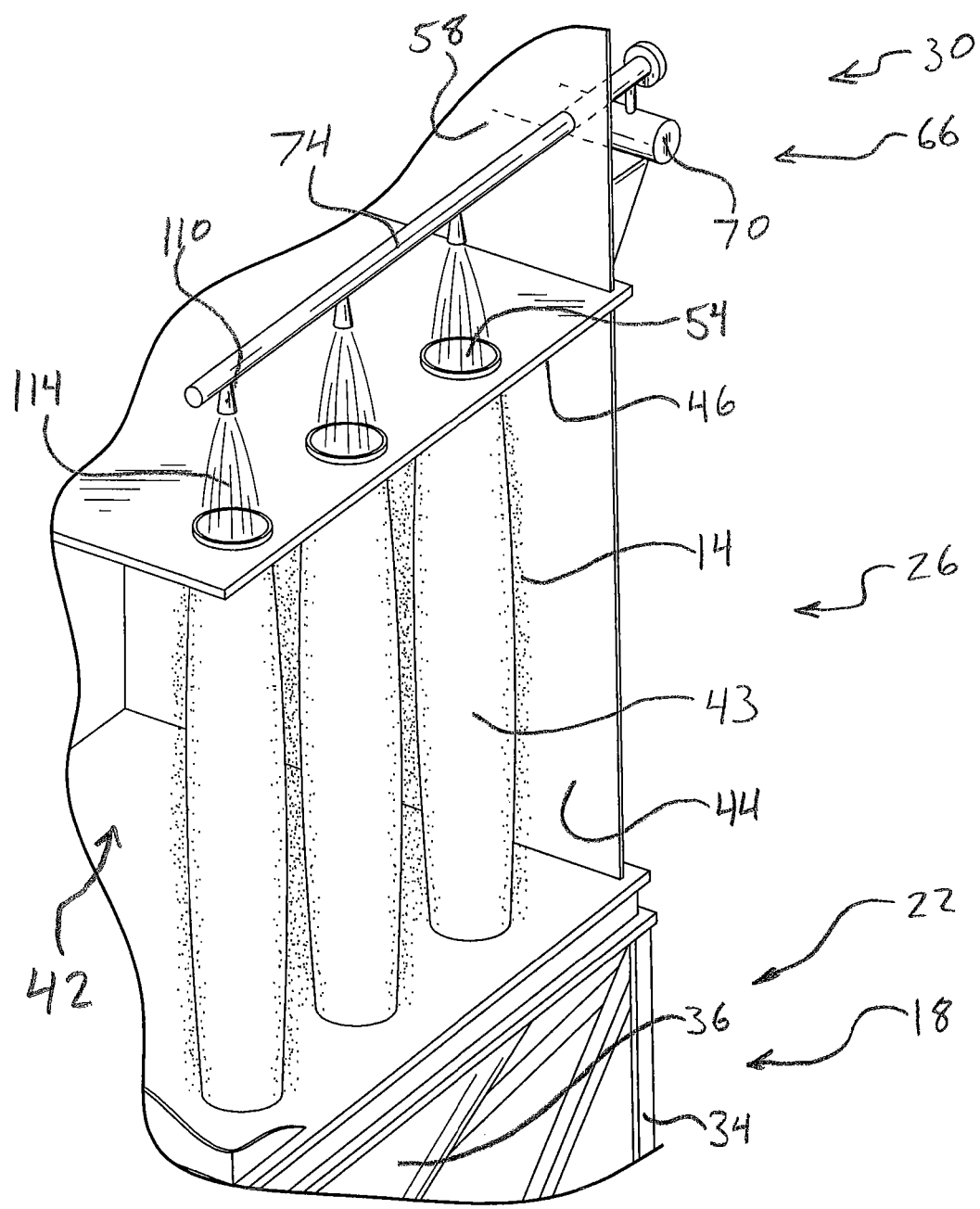
FIG. 2 is an enlarged partial view of the device of FIG. 1 during a cleaning operation.

FIGS. 1 and 2 illustrate a particulate filtration system, which in the preferred embodiment is a dust collector 10 designed to remove particulates 14, such as dust, from the air. The illustrated dust collector 10 includes a support assembly 18, a particulate removal assembly 22 positioned within the support assembly 18, a filtering assembly 26 positioned on top of the support assembly 18, and a cleaning assembly 30 positioned on top of the filtering assembly 26.

The illustrated support assembly 18 includes support members 34 that provide a rigid frame to which the remaining assemblies may be mounted. The illustrated support assembly 18 is generally square-shaped, and the support members 34 include four legs positioned at the four corners of the square and diagonal braces that provide extra rigidity to the frame. In other constructions, the support assembly 18 may be different shapes and may have more or less support members 34 of the same or different shape. In addition, more than four or less than four legs are conceivable.

The illustrated particulate removal assembly 22 is positioned within the support assembly 18 and is attached to the filter assembly 26 such that the particulate removal assembly 22 receives the particulates 14 that are removed from the air by the filter assembly 26. The particulate removal assembly 22 includes a door (not shown) and a hopper 36 with a generally conical shape that funnels the particulates 14 into a container (not shown). The door is positioned in the hopper 36 and is movable between an open position and a closed position. While in the closed position, the particulate removal assembly 22 inhibits air flow out of the particulate removal assembly 22 and collects the particulates 14 that are removed from the air by the filter assembly 26. In the open position, the particulate removal assembly 22 allows the collected particulates 14 to escape the hopper 36 and be emptied into a container for disposal. In other constructions, the particulate removal assembly may have other arrangements. For example, the hopper 36 may have a different profile and the door may be replaced with a powered louver. Other arrangements are also conceivable and are known by those skilled in the art.

The illustrated filter assembly 26 is positioned above the particulate removal assembly 22 and mounted on top of the support assembly 18. The filter assembly 26 includes an intake 38, a screen 40 covering the intake 38 and promoting an equal distribution of airflow in the filter and preventing large objects from entering the filter assembly 26, a classifier section 42, filter media 43 (e.g. filter bags), and a filter assembly enclosure 44, which includes four vertical walls, and a top 46, commonly referred to as a "tubesheet". The bottom of the filter assembly 26 is open to provide access to the particulate removal assembly 22 such that the particulates 14 collected in the filter assembly 26 are allowed to fall into the particulate removal assembly 22. The classifier section 42 is a space between the filter assembly enclosure 44 adjacent the screen 40 and the filter media 43 closest to the screen 40. The classifier section 42 is illustrated as an empty space and provides an area for larger particulates 14 to drop out of the air thereby reducing the load on the filter media 43. In addition, baffles could be added to the classifier section 42 to further remove particulates 14. The top 46 defines one or more openings 54 aligned with the filter media 43 and through which filtered air can flow out of the filter assembly 26 and into the cleaning assembly 30. To escape the filter assembly 26, the air must pass through the filter media 43 to gain access to the openings 54 and pass into the cleaning assembly 30. A fan 56 moves air through the dust collector 10. In other constructions, different filter media 43 may be used and the filter assembly may be arranged differently as is known by those skilled in the art. For example, the classifier section may have a different arrangement or may be removed.

The illustrated cleaning assembly 30 is positioned on top of the filter assembly 26 and includes a cleaning assembly enclosure 58, an exhaust 62, and an advanced cleaning system 66. The cleaning assembly enclosure 58 includes four vertical walls and a top. The illustrated exhaust 62 is attached to the side of the cleaning assembly enclosure 58 and directs cleaned air out of the dust collector 10. In other constructions, the exhaust 62 may be arranged differently and may be attached to a different side of the cleaning assembly enclosure 58.

As is best seen in FIG. 2, the advanced cleaning system 66 includes a primary distribution member 70, one or more secondary distribution members in the form of blowpipes 74 attached to the primary distribution member 70, and one or more nozzles 110 coupled to the blowpipes 74. The primary distribution member 70 distributes bursts of pressurized air to the blowpipes 74, which in turn supply the nozzles 110 with bursts of pressurized air. As the pressurized air passes through the nozzles 110, it is directed into a stream of cleaning air 114 which is directed into the openings 54 and downward though the filter media 43.

In operation, air including particulates 14 enters the filtration assembly 26 of the dust collector 10 through the intake 38 where the screen 40 inhibits large particulates 14 from entering the filter assembly enclosure 44. Once inside the filter assembly enclosure 44 the air moves in a "downflow" air pattern toward the filter media 43. First, the air will pass through the classifier section 42 where more particulates 14 will drop out. After the classifier section 42, the air enters into contact with the filter media 43, and the remaining particulates 14 are trapped on the filter media 43 before the clean air exits through the openings 54 and enters the cleaning assembly 30 and exits the dust collector 10.

The filtering assembly 26 provides several advantages due to the "downflow" air pattern, the geometry of the openings 54, and other features not mentioned. The "downflow" air pattern guides the particulates 14 down to the bottom of the filter assembly 26 and into the particulate removal assembly 22. This causes more particulates 14 to fall out in the classifier section 42 and fewer particulates 14 to be deposited on the filter media 43. Due to the geometry of the openings 54, the particulates 14 that are trapped by the filter media 43 tend to build up a more even dust cake along the entire length of the filter media 43. This even dust cake promotes a better filtering efficiency and allows for more thorough cleaning with lower bag wear. In addition, the resulting dust cake produces a lower pressure drop between the filtering assembly 26 and the cleaning assembly 30 because there is no restriction (venturi) at the top of the bag opening. The lower pressure drop and higher filter efficiency allow the dust collector 10 to function at high efficiency and volume with significantly less filter media 43.

When a significant amount of particulate 14 covers the filter surface 32, the filter media 43 should be cleaned. During the cleaning operation (as is best seen in FIG. 2), the cleaning assembly 30 uses bursts of high velocity air to clean the filter media 43 thus increasing efficiency and prolonging the life of the filter media 43. In the illustrated embodiment, the pressurized air is provided to each blowpipe 74 and directed to each nozzle 110 on the blowpipe 74. Each nozzle 110 directs bursts of high velocity air into the mouth of the filter media 43 through the opening 54. The high velocity air is slowed before entering the opening 54 by a pluming effect, such that the air reaches the mouth of the filter media 43 at ideal cleaning velocities. In one embodiment, the ideal cleaning velocity is between about one-hundred-fifty and two-hundred-fifty feet per second at the opening 54. In other embodiments, different velocities may be ideal as is known by those skilled in the art.

The illustrated dust collector 10 does not need to stop operation to perform a cleaning operation. The low pressure drop created between the filtering assembly 26 and the cleaning assembly 30 is easily overcome by the stream of cleaning air 114 even while the filtering assembly 26 is running. The cleaning operation forces high pressure air through the primary distribution member 70 where the high pressure air is distributed to the blowpipes 74, and forced thorough the nozzles 110 and directed into streams of cleaning air 114 that are directed into the mouth of the filter media 43 through the openings 54. The streams of cleaning air 114 are shot into the filter media 43 in bursts so as to rapidly inflate the filter media 43 and produce a shock or upset that causes the particulates 14 that are trapped on the filter media 43 to dislodge and fall to the filter assembly floor 50 and then down to the particulate removal assembly 22.

The nozzles 110 are high velocity supersonic nozzles designed to provide a greater volume of induced cleaning air and a more even bag inflation. The greater volume of induced cleaning air produces a larger stream of cleaning air 114 and increases cleaning potential. The even bag inflation allows the filter media 43 to be cleaned more thoroughly, with less shock to the filter media 43. This results in lower wear and longer life for the filter media 43.

Figure 4:
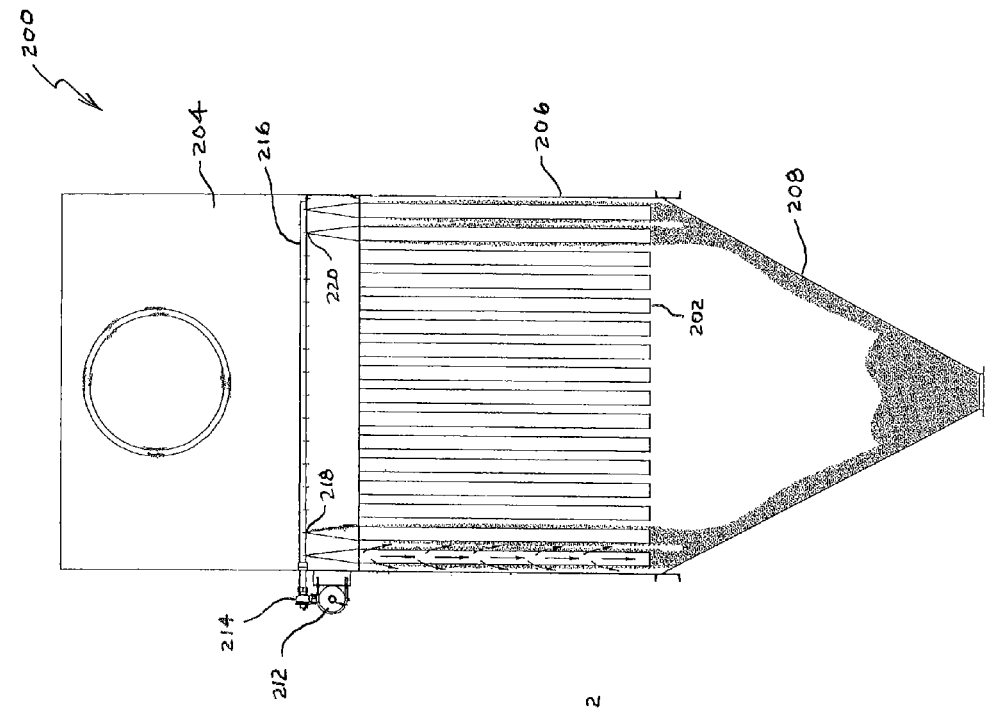
FIG. 4 is a section view taken along line 4-4 in FIG. 3.
Figure 3:
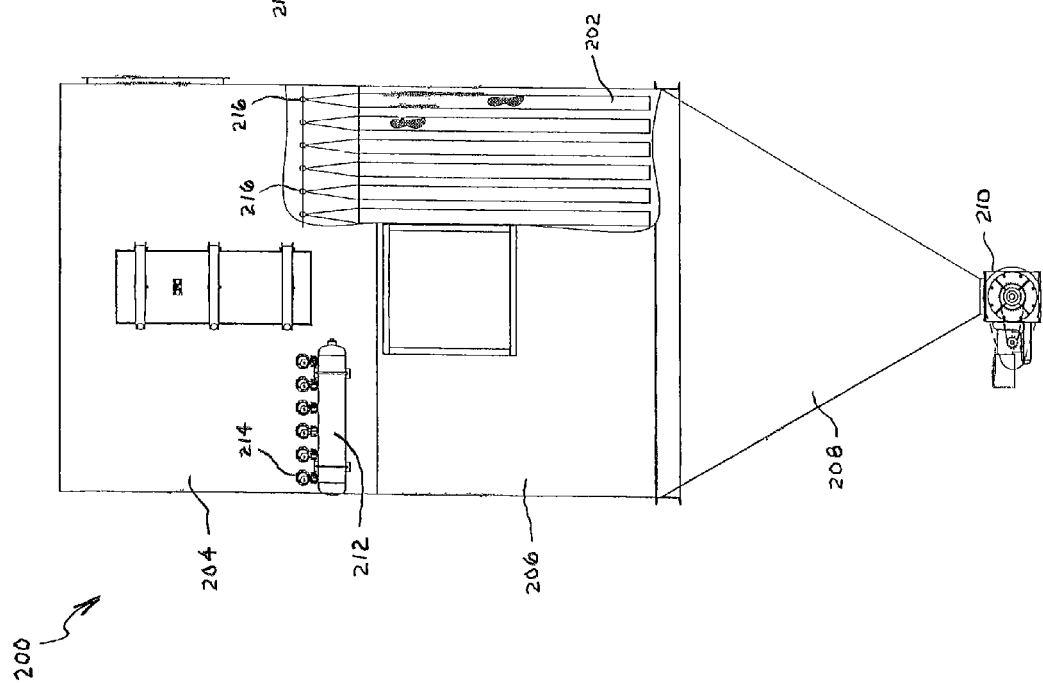
FIG. 3 is a partially cut-away end view of another particulate filtration device embodying the present invention and having more filter bags.

FIGS. 3 and 4 illustrate a much larger dust collector 200 having two-hundred-fifty-six filter bags 202. The duct collector 200 includes an upper bin 204 defining a clean air chamber, a lower bin 206 defining a dirty air chamber, and a hopper 208 for directing particulate removed from the bags 202. A rotary air lock 210 (FIG. 3 only) is mounted to the bottom of the hopper 208 for the discharge of collected particulate.

The duct collector 200 further includes a manifold 212 for providing compressed air to a series of diaphragm valves 214. Each diaphragm valve 214 is controlled to selectively provide compressed air to a series of blow pipes 216.

Referring to specifically to FIG. 4, each blow pipe 216 extends substantially the full width of the upper bin 204 and includes sixteen cleaning nozzles 218,220. Each cleaning nozzle 218,220 is aligned with the opening 222 of a corresponding filter bag 202. Due to the phenomenon described above in the Summary of the Invention, the pressure of the air provided to the nozzles 218,220 on a particular blow pipe 216 is not consistent along the length of the blow pipe 216. That is, the pressure experienced by the nozzles on the end of the blow pipe 216 nearest the manifold 212 ("nearest nozzles 218") is typically lower than the pressure experienced by the nozzles farthest from the manifold 212 ("farthest nozzles 220"). In order to account for this difference in pressure, the configuration of the nearest nozzles 218 is different than the configuration of the farthest nozzles 220.

In the illustrated embodiment, the goal was to modify the configuration of the nearest nozzles 218 so that they achieve a flow rate (i.e., weight flow rate of air) that is closer to that of the flow rate of the farthest nozzles 220, even though the pressure of the air provided to the nearest nozzles 218 is less than the pressure of the air provided to the farthest nozzles 220. In order to achieve this, three nozzle characteristics were modified: throat size A, exit angle α, and exit size B. In the illustrated embodiment, two different nozzle configurations were used, one for the eight nearest nozzles 218, and the other for the eight farthest nozzles 220. It should be understood that a larger number of different nozzle configurations could be used. For example, 16 different nozzle configurations could be used along the length of the blow pipe 216 to achieve a more uniform flow rate through the different nozzles.

Figure 5:
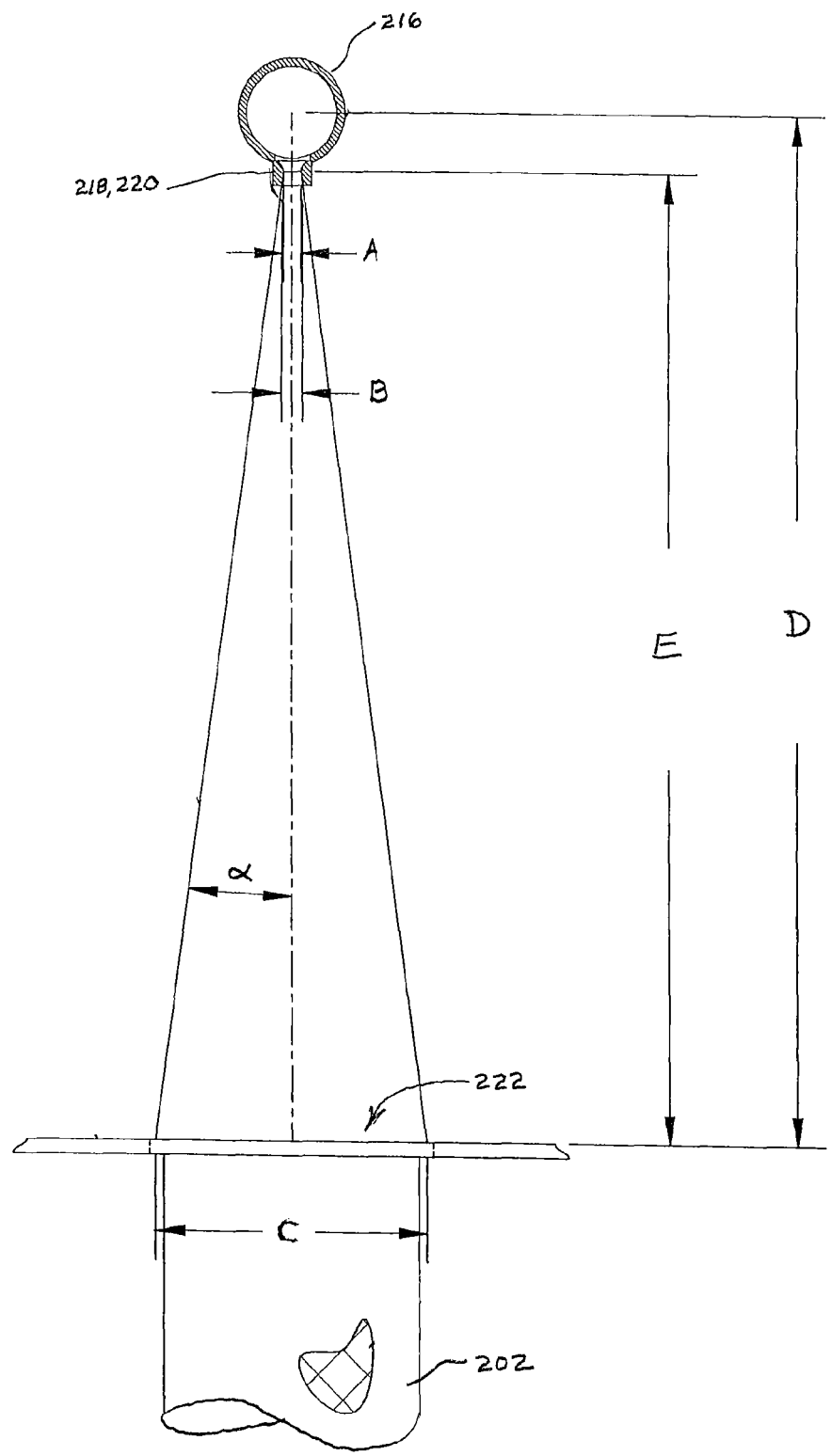
FIG. 5 is a section view taken along line 5-5 in FIG. 4.

Referring to FIG. 5, in the illustrated embodiment, each filter bag 202 is cylindrical in shape and the opening 222 of each bag 202 has a diameter C of about 4.7906 inches. The center of each blow pipe 216 is positioned a distance D of about 18.0 inches from the open end of the corresponding filter bag 202. Each nozzle includes a converging section 230, a throat 232, and a diverging section 234. The throat 230 is positioned a distance E of about 16.9638 inches from the open end of the corresponding filter bag 202.

The throat size A is defined as the size of the narrowest portion of the nozzle between the converging section 230 and the diverging section 234. The exit angle α is defined as an angle at which the air exits the nozzle, and is commonly referenced as a half angle. The exit size B is the size of the nozzle at the nozzle exit. The nozzles also include an inlet length F, an outlet length G, and an overall length H. In the illustrated embodiment, because a cross-section of the nozzles at any location along the length of the nozzle produces a circular interior configuration, the throat size A and exit size B are commonly given as a diameter.

Figure 6:
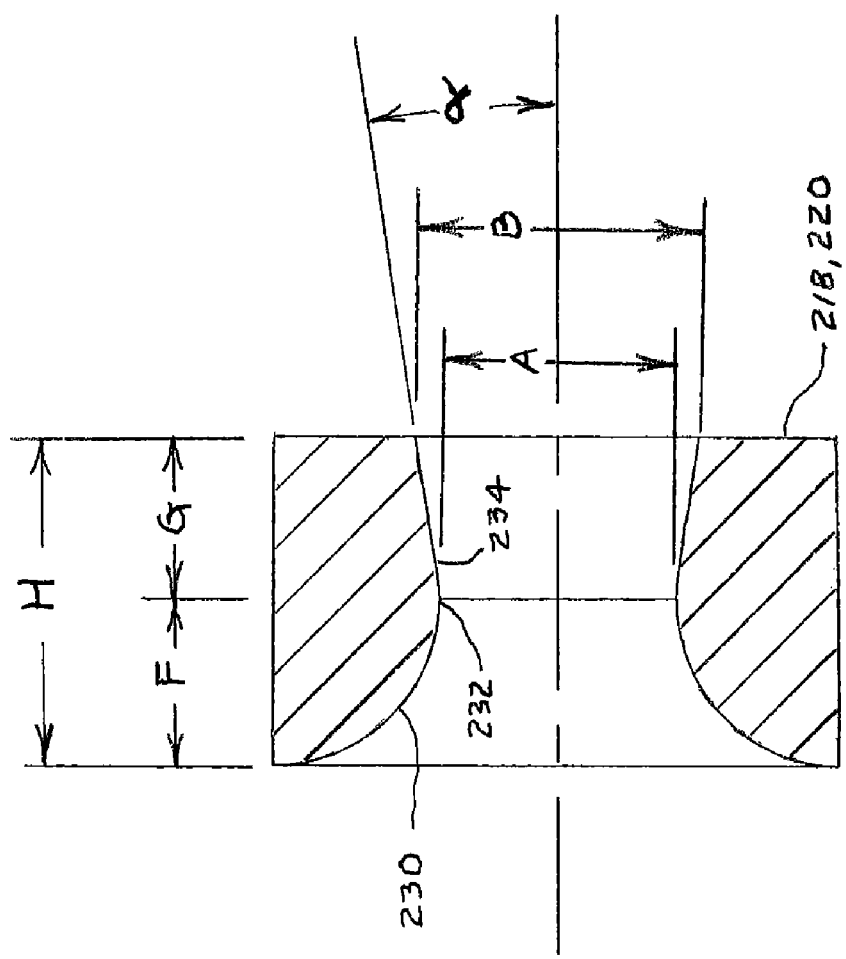
FIG. 6 is an enlarged section view of a nozzle used in the embodiment of FIG. 5.
Figure 7:
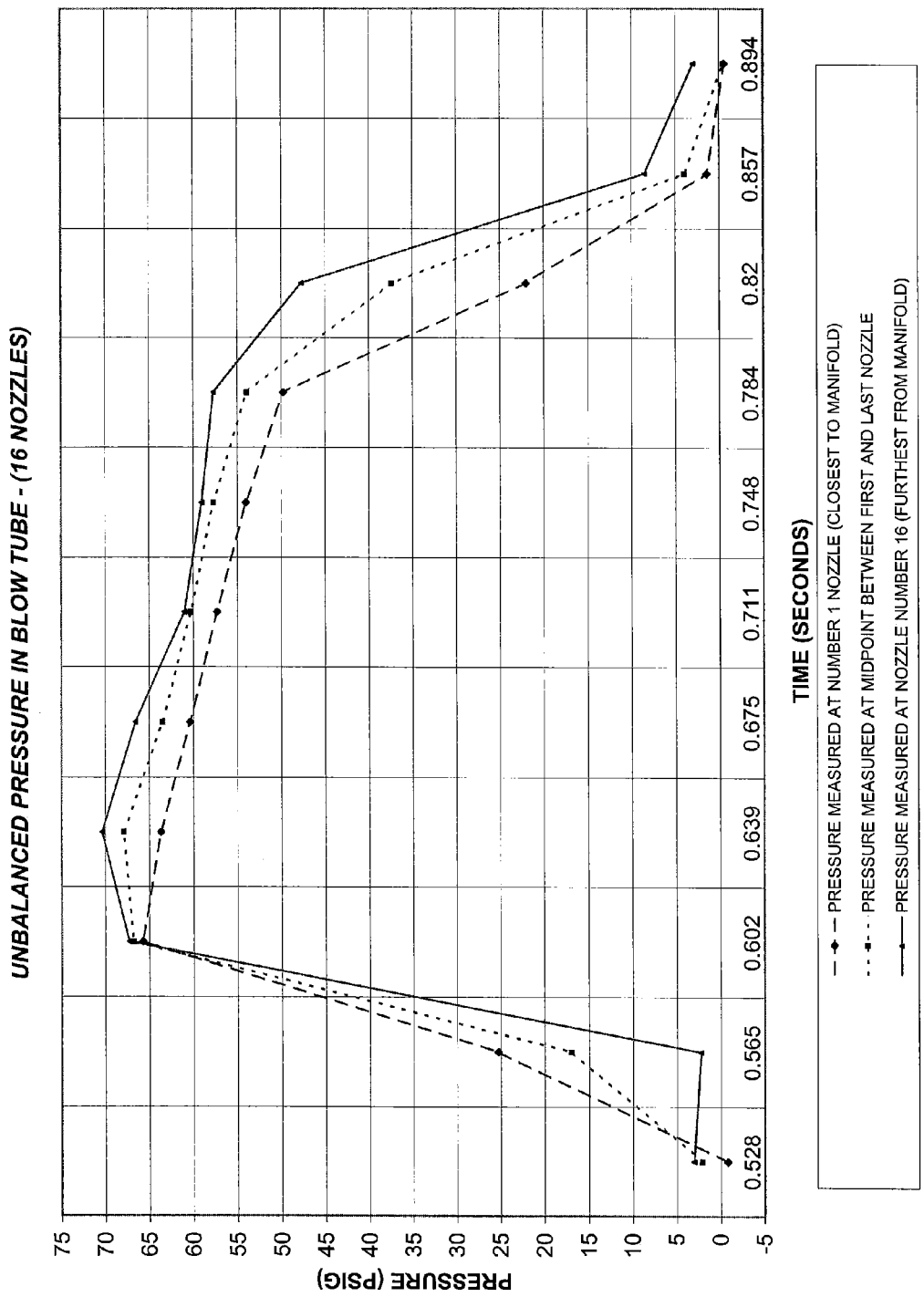
FIG. 7 is a chart that illustrates the phenomenon described in the Summary.

Referring to FIG. 6, in the illustrated embodiment, the eight nearest nozzles 218 have a throat size/diameter A of about 0.324 inches, an exit angle α of about 7.5 degrees, an exit size/diameter B of about 0.382 inches, an inlet length F of about 0.180 inches, an outlet length G of about 0.220 inches, and an overall length H of about 0.400 inches. The eight farthest nozzles 220 have a throat size/diameter A of about 0.3125 inches, an exit angle α of about 7.5191 degrees, an exit size/diameter B of about 0.3750 inches, an inlet length F of about 0.180 inches, an outlet length G of about 0.237 inches, and an overall length H of about 0.417 inches. It should be understood that the present invention is not limited to the specific dimensions listed above. In fact, depending on the parameters that one is trying to achieve, the dimensions listed above could be quite different and/or other dimensions could be modified to achieve the desired goal.

Thus, the invention provides, among other things, a unique combination of nozzles on a blowpipe that achieves a more equalized flaw rate between the nozzles. Various features and advantages of the invention are set forth in the following claims.

What is claimed is:

1. A particulate filtration device comprising:
   filter media having an upstream surface and a downstream surface;
   a gas-moving device for moving gas through the filter media from the upstream surface toward the downstream surface; and
   a cleaning assembly including a blow pipe having a plurality of cleaning nozzles for directing a flow of cleaning gas toward the filter media, wherein a first one of the cleaning nozzles comprises a structural characteristic that is different than a structural characteristic of a second one of the cleaning nozzles to affect the flow rate through the nozzles, and wherein the first one of the cleaning nozzles and the second one of the cleaning nozzles are non-coaxial.

2. A particulate filtration device as claimed in claim 1, wherein a plurality of the cleaning nozzles have structural characteristics substantially similar to the first one of the cleaning nozzles, and wherein a plurality of the cleaning nozzles have structural characteristics substantially similar to the second one of the cleaning nozzles.

3. A particulate filtration device as claimed in claim 1, wherein the structural characteristic comprises a throat size.

4. A particulate filtration device as claimed in claim 1, wherein the structural characteristic comprises an exit angle.

5. A particulate filtration device as claimed in claim 1, wherein the structural characteristic comprises an exit size.

6. A particulate filtration device as claimed in claim 1, wherein the filter media comprises a filter bag corresponding with each nozzle, and wherein both the first one and the second one of the cleaning nozzles are spaced substantially the same distance from the corresponding filter bag.

7. A particulate filtration device as claimed in claim 1, wherein the cleaning assembly includes a plurality of blow pipes coupled to a gas-pressurized manifold, and a valve positioned between the manifold and each blow pipe to control gas flowing from the manifold to the blow pipes, wherein each blow pipe has a plurality of cleaning nozzles.

8. A particulate filtration device as claimed in claim 7, wherein, when a valve is opened to allow pressurized gas to enter the corresponding blow pipe, a static pressure at a nozzle nearer the manifold is less than a static pressure at a nozzle farther from the manifold.

9. A particulate filtration device as claimed in claim 8, wherein each nozzle has a throat size, an exit angle, and an exit size, and wherein the nozzle nearer the manifold has a larger throat size than the nozzle farther from the manifold.

10. A particulate filtration device as claimed in claim 8, wherein each nozzle has a throat size, an exit angle, and an exit size, and wherein the nozzle nearer the manifold has a smaller exit angle than the nozzle farther from the manifold.

11. A particulate filtration device as claimed in claim 8, wherein each nozzle has a throat size, an exit angle, and an exit size, and wherein the nozzle nearer the manifold has a larger exit size than the nozzle farther from the manifold.

12. A cleaning assembly for a particulate filtration device including filter media, the cleaning assembly comprising:
a blow pipe;
a plurality of cleaning nozzles positioned to receive gas from the blow pipe and adapted to direct a flow of cleaning gas toward the filter media, wherein a first one of the cleaning nozzles comprises a structural characteristic that is different than a structural characteristic of a second one of the cleaning nozzles to affect the flow rate through the nozzles, and wherein the first one of the cleaning nozzles and the second one of the cleaning nozzles are non-coaxial.

13. A cleaning assembly as claimed in claim 12, wherein a plurality of the cleaning nozzles have structural characteristics substantially similar to the first one of the cleaning nozzles, and wherein a plurality of the cleaning nozzles have structural characteristics substantially similar to the second one of the cleaning nozzles.

14. A cleaning assembly as claimed in claim 12, wherein the structural characteristic comprises a throat size.

15. A cleaning assembly as claimed in claim 12, wherein the structural characteristic comprises an exit angle.

16. A cleaning assembly as claimed in claim 12, wherein the structural characteristic comprises an exit size.

17. A cleaning assembly as claimed in claim 12, wherein the cleaning assembly comprises a plurality of blow pipes coupled to a gas-pressurized manifold, and a valve positioned between the manifold and each blow pipe to control gas flowing from the manifold to the blow pipes, wherein each blow pipe has a plurality of cleaning nozzles.

18. A particulate filtration device as claimed in claim 17, wherein each nozzle has a throat size, an exit angle, and an exit size, and wherein the nozzle nearer the manifold has a larger throat size than the nozzle farther from the manifold.

19. A particulate filtration device as claimed in claim 17, wherein each nozzle has a throat size, an exit angle, and an exit size, and wherein the nozzle nearer the manifold has a smaller exit angle than the nozzle farther from the manifold.

20. A particulate filtration device as claimed in claim 17, wherein each nozzle has a throat size, an exit angle, and an exit size, and wherein the nozzle nearer the manifold has a larger exit size than the nozzle farther from the manifold.

* * * * *